United States Patent
Matsuda et al.

(10) Patent No.: US 6,726,336 B2
(45) Date of Patent: Apr. 27, 2004

(54) PROJECTOR HAVING A HINGED FRONT COVER WITH A LOUDSPEAKER

(75) Inventors: Naoya Matsuda, Tokyo (JP); Hiroshi Nagai, Kanagawa (JP); Takuji Ohkubo, Chiba (JP); Yusuke Kanzaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 207 days.

(21) Appl. No.: 10/043,599

(22) Filed: Jan. 10, 2002

(65) Prior Publication Data

US 2002/0109822 A1 Aug. 15, 2002

(30) Foreign Application Priority Data

Jan. 12, 2001 (JP) ........................................ P2001-005313
Jan. 12, 2001 (JP) ........................................ P2001-005318

(51) Int. Cl.[7] .................. G03B 21/14; G03B 21/22; G03B 31/00; H04N 5/64; H04N 9/31
(52) U.S. Cl. .................. 353/122; 353/119; 353/15; 348/744
(58) Field of Search ............................. 353/122, 119, 353/15; 348/744

(56) References Cited

U.S. PATENT DOCUMENTS 5,676,442 A    10/1997   Fujimori ..................... 353/119

FOREIGN PATENT DOCUMENTS

EP            0834765        3/1997    ........... G03B/21/16

*Primary Examiner*—Russell Adams
*Assistant Examiner*—Melissa J Koval
(74) *Attorney, Agent, or Firm*—Jay H. Maioli

(57) ABSTRACT

A projector having flat outside surfaces when not in use and a control panel disposed at an upper portion of a main body of the projector during use. A front cover is provided with a control panel on its back side and is rotatably supported on the main body by double hinge mechanisms such that the projector is box-shaped when the front cover is stored in a storage position for covering the front side of a projection lens, and a surface of the front cover is inclined and directed to the rear upper side of the projector main body when the front cover is rotated from the storage position to an open position. Loudspeakers are incorporated in the cover so that the loudspeakers are projected at an upper portion of the main body when the front cover is rotated from the storage position to the open position.

13 Claims, 11 Drawing Sheets

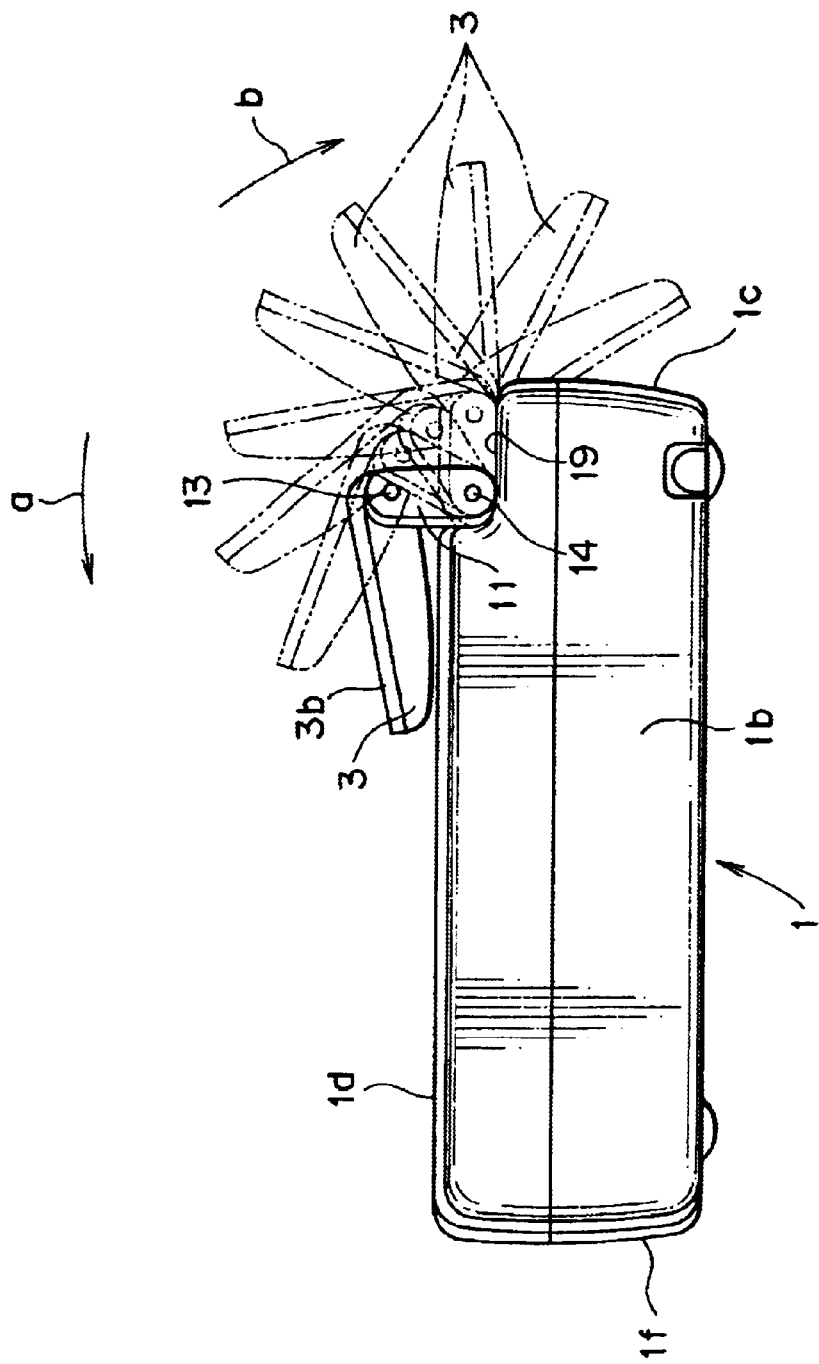

PROJECTOR HAVING A HINGED FRONT COVER WITH A LOUDSPEAKER

BACKGROUND OF THE INVENTION

The present invention relates to a projector for displaying an image in which picture light produced by modulating light from a light source by light bulbs such as a liquid crystal panel is projected on a screen by a projection lens to thereby display an image, and particularly to a projector excellent in portability such as a portable type liquid crystal projector.

One important factor of a portable type liquid crystal projector is smallness in size and excellent portability. For this factor, it is necessary that, in a non-use condition such as at the time of carrying the projector, recesses and projections on the outside surface of the projector are as few and little as possible so that the projector can be easily contained in a bag or the like, and that the portion where the projection lens is exposed is protected. Thus, conventionally, it is contemplated that the liquid crystal projector main body is constructed in the shape of a flat box, the projection lens is exposed on the front side of the projector main body, and the front side of the projection lens is opened and closed with a front cover.

However, when the projection lens exposed on the front side of the liquid crystal projector main body is simply opened and closed with the front cover, the front cover becomes a projected portion on the front side at the time of carrying, resulting in an increase in size or lowering in portability of the liquid crystal projector. In addition, there is a problem as to the protection of the front cover, such as possible easy breakage of the front cover by collision on other things at the time of carrying. Besides, in a portable type liquid crystal projector, a control panel is desirably disposed on the upper side of the main body from the viewpoint of operability. However, when the control panel is disposed on the upper side of the liquid crystal projector, a space for the control panel must be provided on the upper side of the main body, so that the size of the liquid crystal projector, particularly the height (thickness) of the main body, is enlarged, leading to poor portability. Furthermore, operating buttons and the like of the control panel are always exposed to the exterior, and protection thereof at the time of carrying is not sufficient, leading to possible easy breakage by collision against other things.

In addition, in order to make a portable type liquid crystal projector small in size and excellent in portability, it is necessary that, in a non-use condition such as at the time of carrying, recesses and projections on the outside surface of the projector are as few and little as possible so that the projector can easily be contained in a bag or the like. In a conventional liquid crystal projector, an inputted picture signal is projected onto a screen or the like and, at the same time, a voice signal is outputted as voice from a loudspeaker incorporated in the liquid crystal projector main body. In a meeting or the like, the locations of the audience who see and hear the picture and voice outputted from the liquid crystal projector are arbitrary as far as they can see the picture on the screen, and, therefore, it is desired that the loudspeaker is located at an upper position in the main body of the liquid crystal projector so that the voice output is uniform in all directions.

However, when the loudspeaker is incorporated at an upper position in the main body of the liquid crystal projector, a surplus space for incorporating the loudspeaker is needed at an upper portion in the main body. As a result, the size of the liquid crystal projector, particularly the height (thickness) of the main body, is increased, resulting in poor portability. On the other hand, when the loudspeaker is incorporated at, for example, a side face of the main body of the liquid crystal projector, the height (thickness) of the projector is not increased, but the acoustic effects (particularly, the spreading of sound) become a problem depending on the location of listening to the voice. Taking this into account, in order to enhance the acoustic effects, it may be contemplated to project the loudspeaker to the exterior of the main body of the liquid crystal projector and dispose the loudspeaker in a predetermined location. In that case, also, the outside surface of the liquid crystal projector has recesses and projections, resulting in that the portability of the projector is deteriorated.

SUMMARY OF THE INVENTION

The present invention has been made in order to solve the above-mentioned problems. Accordingly, it is an object of the present invention to provide a projector such that the outside surfaces of the projector are flat at non-use times and that a control panel at a front cover can be operated at an upper portion of the projector main body at the time of using the projector.

It is another object of the present invention to provide a projector which can have both good portability of the projector and good acoustic property at the time of using the projector.

In order to attain the above objects, the projector according to the present invention comprises a roughly box-type projector main body, a projection lens exposed on the front side of the projector main body, a front cover for opening and closing the front side of the projection lens, and a left-right pair of double hinge mechanisms for turnably supporting both left and right end portions of the front cover on the projector main body, wherein the left-right pair of double hinge mechanisms comprise a pair of first and second parallel hinge pins having one-side ends supported respectively on the front cover and the projector main body, and hinge arms rectangularly connecting the other-side ends of the first and second hinge pins, and the front cover can be turned between a storage position of being roughly vertically disposed on the front side of the projector main body to cover the front side of the projection lens and an open position of being turned to an upper portion of the projector main body to open the front side of the projection lens. In addition, the projector according to the present invention is such that the inner side of the front cover for closing the projection lens is constructed to be a control panel.

In the projector according to the present invention constituted as above, the front cover is turnably supported on the projector main body by the double hinge mechanisms. Therefore, the projector as a whole assumes a box type shape when the front cover is stored in the storage position for covering the front side of the projection lens. In addition, when the front cover is turned from the storage position for covering the front side of the projection lens to the open position at an upper portion of the projector main body so that the front side of the projection lens is opened, the hinge pins on the front cover side of the double hinge mechanisms for the front cover can be moved to positions above the upper surface of the projector main body, and the front cover can be directed to the skewly rear upper side of the projector main body. Besides, the inner side of the front cover for closing the projection lens is constructed to be a control panel. Therefore, it is unnecessary to provide a space for disposing the control panel at an upper portion of the main body, it is possible to secure reduction in size and protection of the control panel at the time of carrying the projector, and the control panel can be directed to the upper side of the main body and can be easily operated on the upper side of the main body at the time of using the projector.

In addition, the projector according to the present invention is so constructed that a projection lens is exposed on the front side of a roughly box type projector main body, a loudspeaker is incorporated in a front cover for opening and closing the front side of the projection lens, and the loudspeaker is projected to the upper side of the projector main body by the movement of the front cover from a storage position for covering the front side of the projection lens to an open position on the upper side of the projector main body for opening the front side of the projection lens.

The projector according to the present invention constituted as above can store the loudspeaker in the projector and eliminate recesses and projections at the outside surfaces of the projector at non-use times such as at the time of carrying the projector, and can project the loudspeaker to the upper side of the projector by opening the front side of the projection lens at the time of using the projector.

BRIEF DESCRIPTION OF THE DRAWINGS

These and other objects and features of the present invention will become clear from the following description of the preferred embodiments given with reference to the accompanying drawings, in which:

FIG. 2 is a side view showing the opening and closing movements of the front cover of the liquid crystal projector;

DESCRIPTION OF THE PREFERRED EMBODIMENTS

Now, embodiments of a liquid crystal projector to which the present invention is applied will be described below in the following order.

Figure 8:
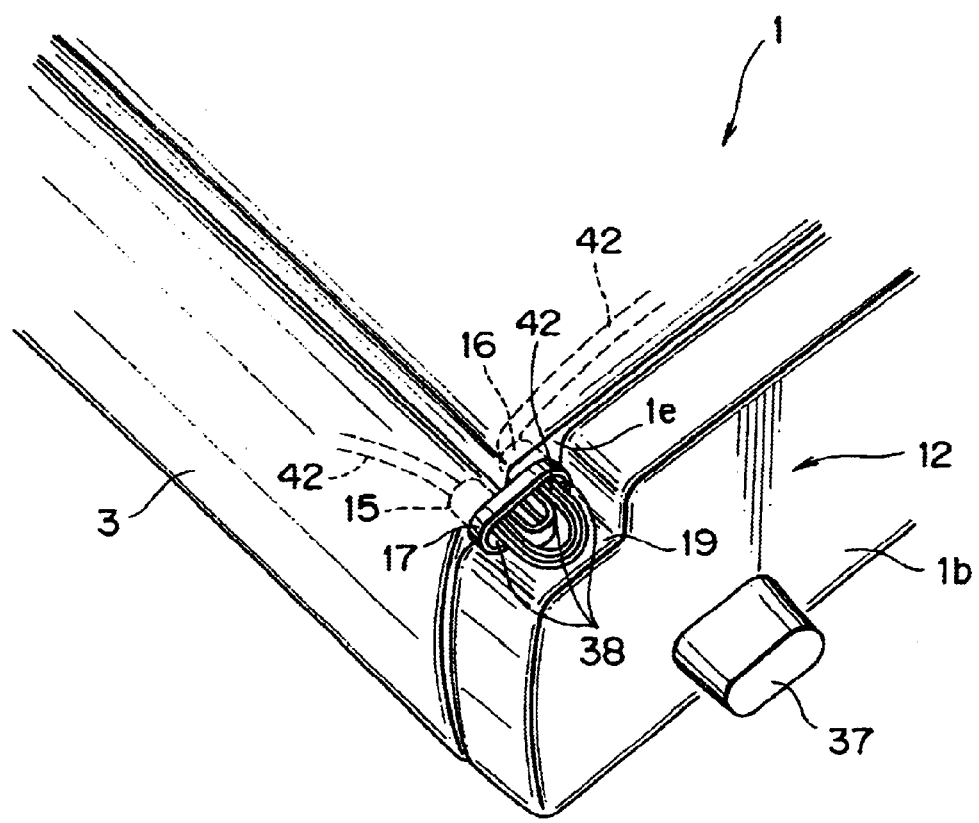
FIG. 8 is a partly exploded perspective view showing the condition of passing a wire through the other double hinge mechanism.
Figure 9:
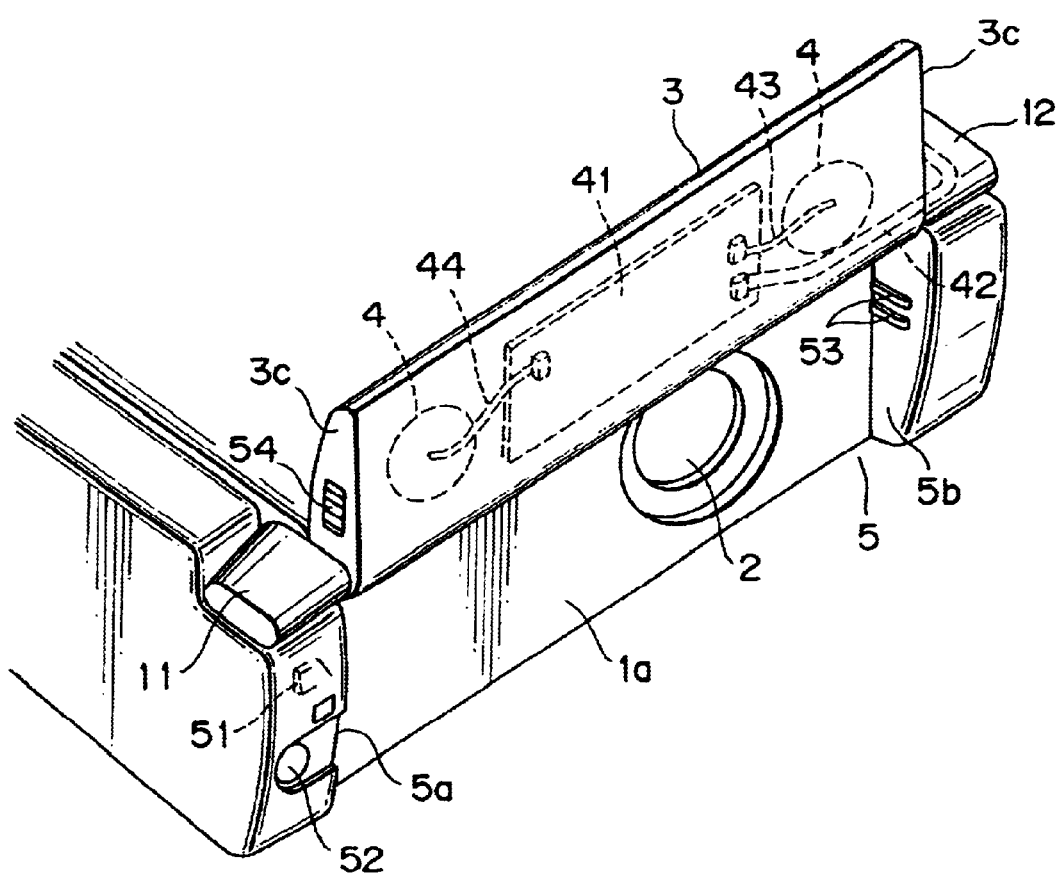
FIG. 9 is a perspective view illustrating the wiring in the front cover of the liquid crystal projector.
Figure 10A:
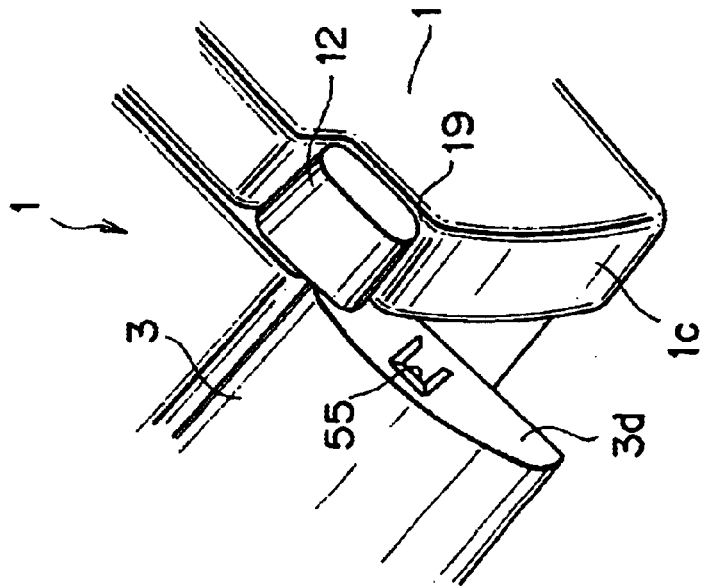
FIGS. 10A and 10B are perspective views illustrating a lock mechanism of the front cover of the liquid crystal projector.
Figure 10B:
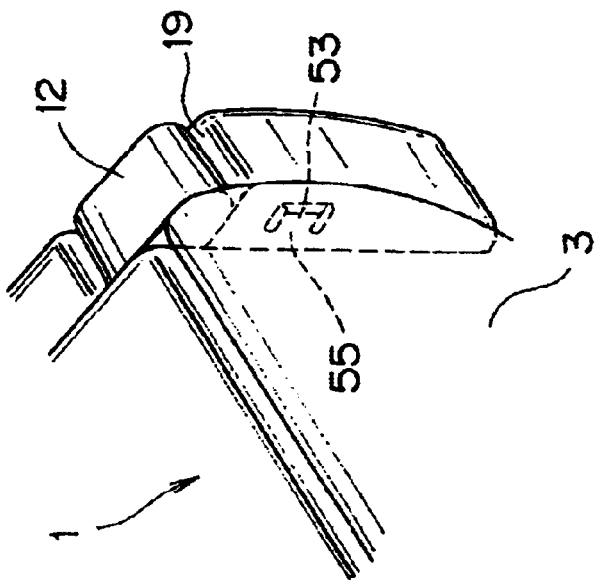
Figure 11:
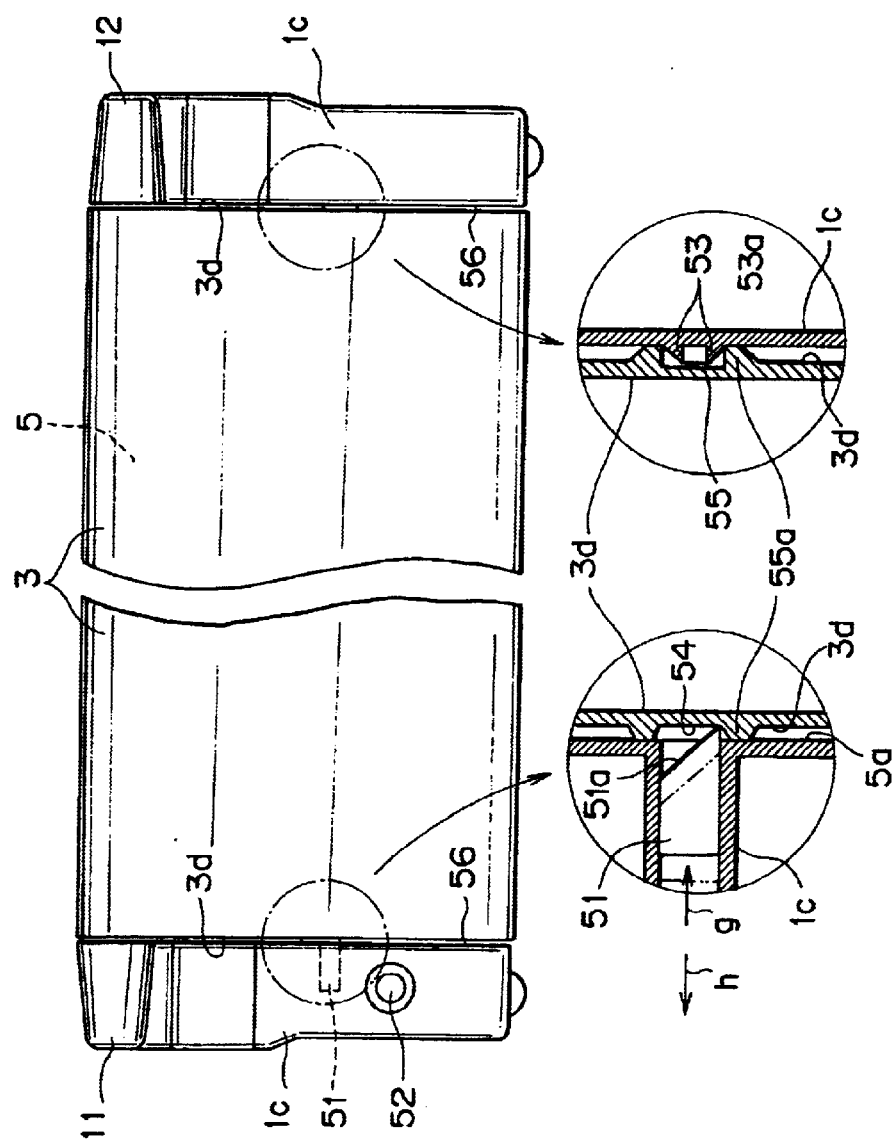
FIG. 11 is a partly broken front view illustrating a locking/unlocking mechanism of the front cover.

(1) Description of an opening and closing mechanism of a front cover incorporating a loudspeaker and used also as a control panel (FIGS. 1 to 11);

(1-1) Description of double hinge mechanisms (FIGS. 1 to 7);

(1-2) Description of a wiring structure of wires for the loudspeakers (FIGS. 8 and 9);

(1-3) Description of a locking/unlocking means for the front cover (FIGS. 9 to 11);

(1-4) Description of opening and closing operations of the front cover (FIGS. 1 to 11).

(1) Description of an Opening and Closing Mechanism of a Front Cover Incorporating a Loudspeaker and Used also as a Control Panel First, as shown in FIGS. 1 to 11, the portable type liquid crystal projector is formed in a flat design not having recesses and projections at the outside surfaces, and a projection lens 2 is exposed at a position near one side of a front surface 1a of a liquid crystal projector main body 1 formed in a flat box type. A front cover 3 is provided which opens and closes the front side of the projection lens 2. The front cover 3 is used also as a control panel, and a left-right pair of loudspeakers 4 are incorporated at both left and right end positions inside of the front cover 3. Front end portions of both left and right side portions 1b of the liquid crystal projector main body 1 are projected to the front side in parallel, to form recessed portions 5 on the front side of the front surface 1a. The inside surface opposite to the outside surface 3a of the front cover 3 is formed to be a control panel surface 3b, and a plurality of operating buttons 6 for operating the liquid crystal projector such as a power source button, an input changeover button, an image adjustment and menu button, a menu selection and adjustment button, an adjustment end button and a reset button are disposed at a central portion of the control panel surface 3b. A left-right pair of sound discharging portion 7 provided with a multiplicity of sound discharging holes are disposed at both left and right positions of the control panel surface 3b, and the left-right pair of loudspeakers 4 are disposed on the inner side of the left-right pair of sound discharging portions 7.

Figure 3:
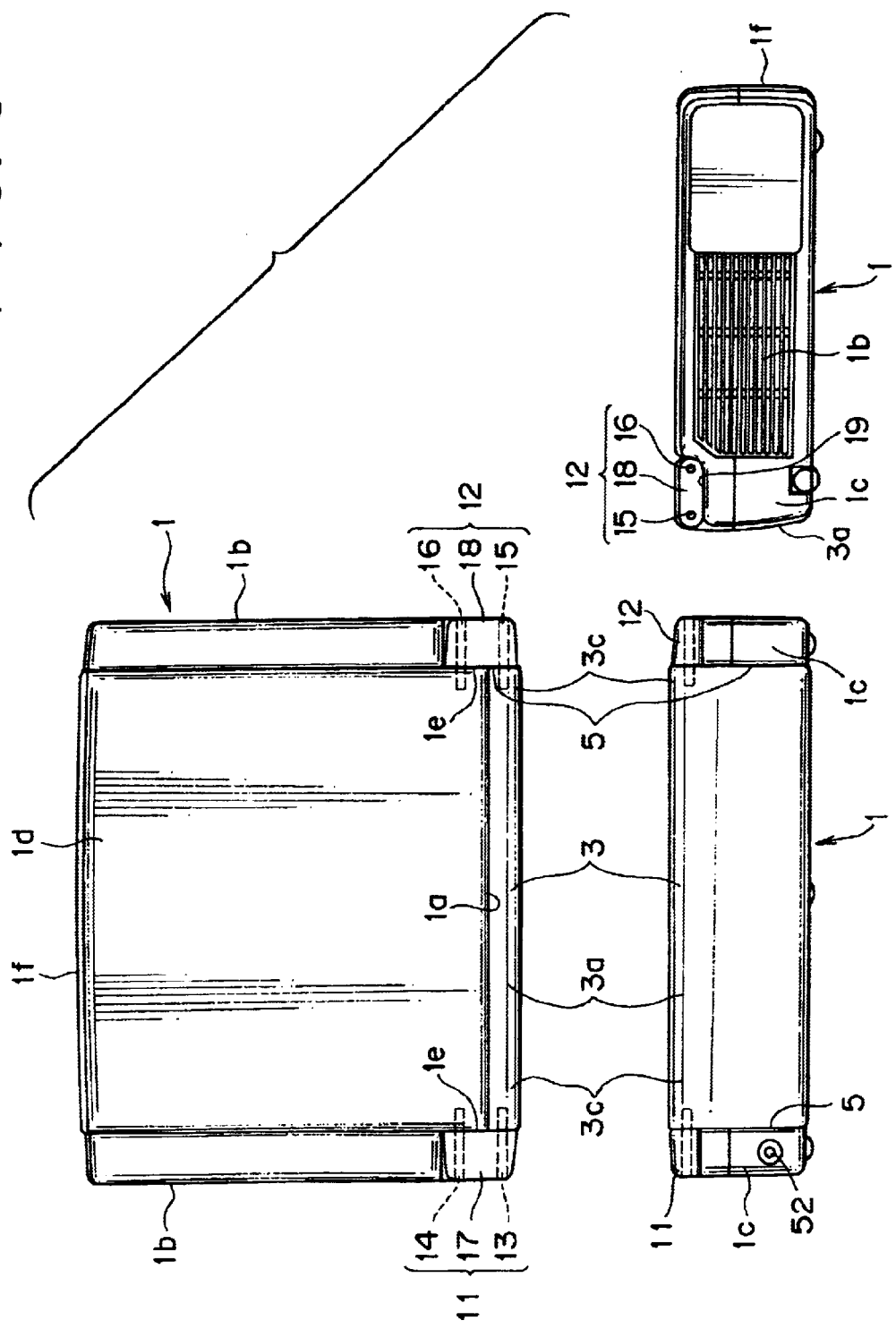
FIG. 3 shows a plan view, a front view and a side view showing the stored condition of the front cover of the liquid crystal projector.
Figure 4:
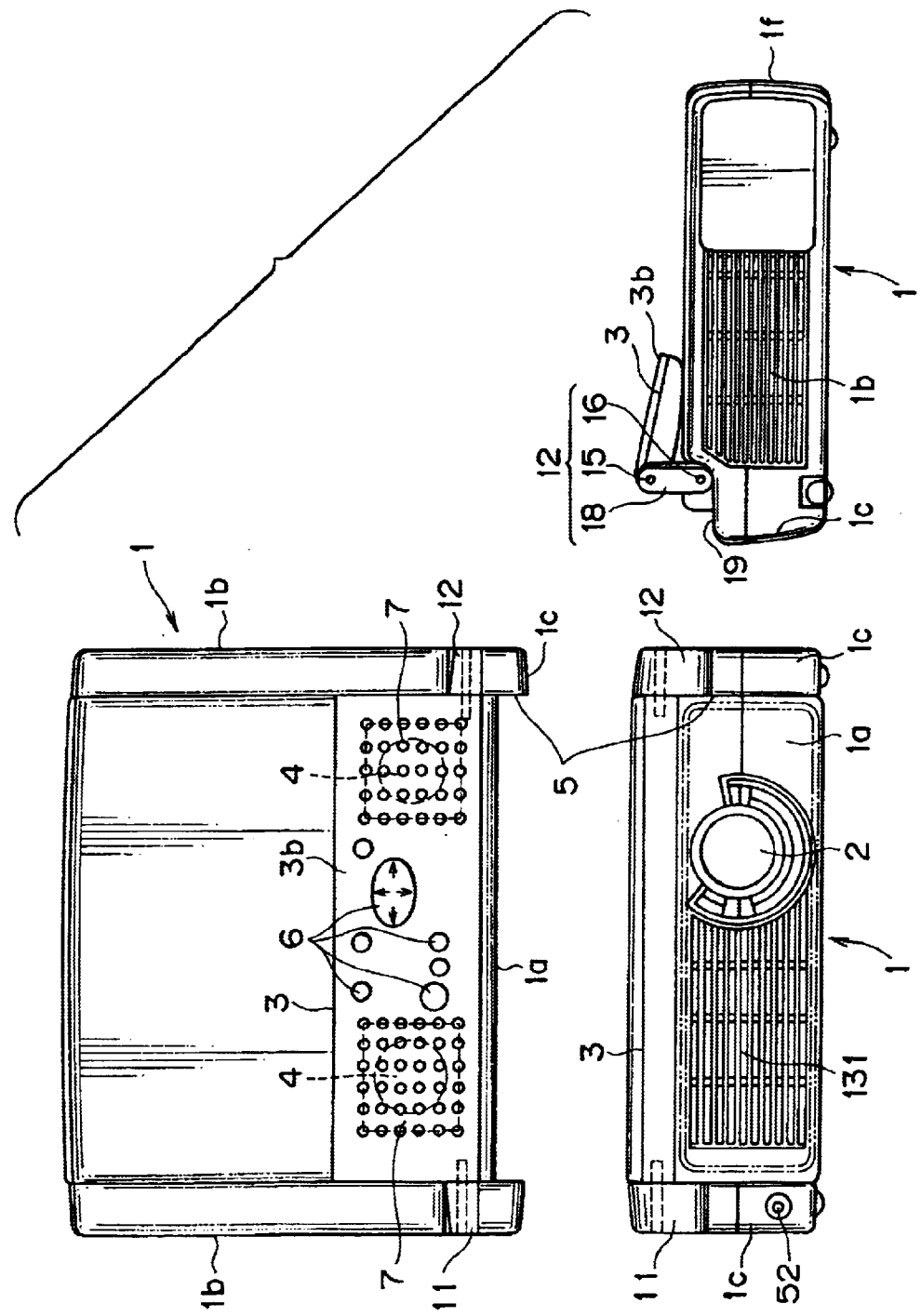
FIG. 4 shows a plan view, a front view and a side view showing the opened condition of the front cover of the liquid crystal projector.

The front cover 3 is vertically turnably supported on the liquid crystal projector main body 1 by a left-right pair of double hinge mechanisms 11, 12 which will be described below. The front cover 3 can be turned in the directions of arrows a and b, namely, in vertical and forward and rearward directions in an angle range of not less than 270°, between a storage position of being vertically stored in the recessed portion 5 of the liquid crystal projector main body 1 so as to cover the front side of the projection lens 2, as shown in FIG. 3, and an open position of being turned to the upper side of the liquid crystal projector main body 1 to direct the control panel surface 3b and the left-right pair of loudspeakers 4 to the skewly rear upper side, as shown in FIG. 4. When the front cover 3 is vertically stored in the recessed portion 5 of the liquid crystal projector main body 5 to cover the front side of the projection lens 2, the five surfaces other than the bottom surface of the liquid crystal projector are all flat, and the liquid crystal projector is in a simple design.

(1-1) Description of Double Hinge Mechanisms

Next, as shown in FIGS. 1 to 7, a left-right pair of double hinge mechanisms 11, 12 are connected between upper end portions of both left and right end portions 3c of the front cover 3 (the upper end positions in the condition where the front cover 3 is vertically stored in the recessed portion 5) and both left and right side portions of a front end portion 1e in an upper portion 1d of the liquid crystal projector main body 1. The left-right pair of double hinge mechanisms 11, 12 include first and second parallel hinge pins 13, 14 and 15, 16, and hinge arms 17, 18. The left-right pair of double hinge mechanisms 11, 12 are contained in a left-right pair of recessed portions 19 formed at upper end portions of the front end portions 1c at both left and right side portions 1b of the liquid crystal projector main body 1. The left and right pairs of hinge pins 13, 14 and 15, 16 of the left-right pair of double hinge mechanisms 11, 12 are disposed on two parallel rotation center lines.

Figure 5:
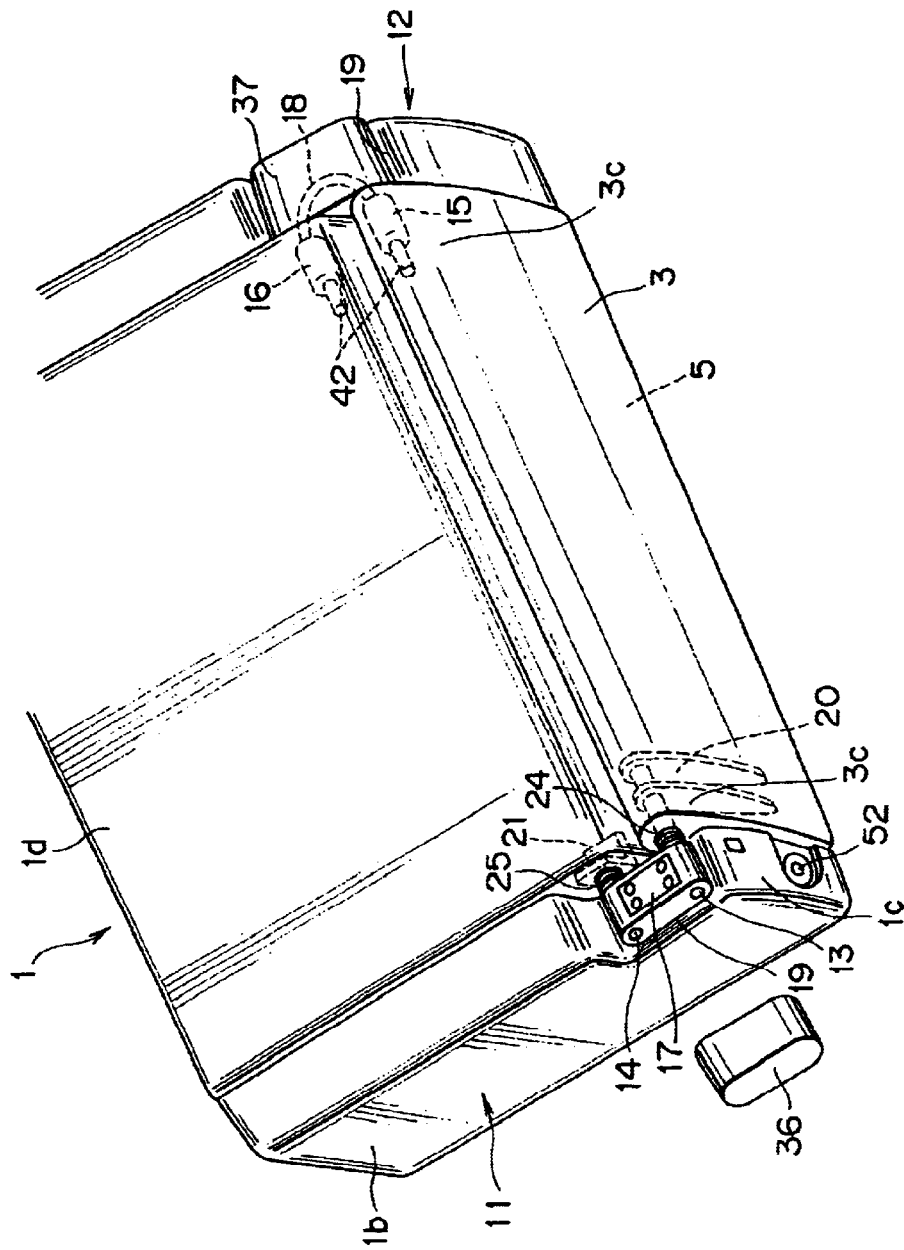
FIG. 5 is a partly exploded perspective view of one of double hinge mechanisms of the liquid crystal projector.
Figure 6:
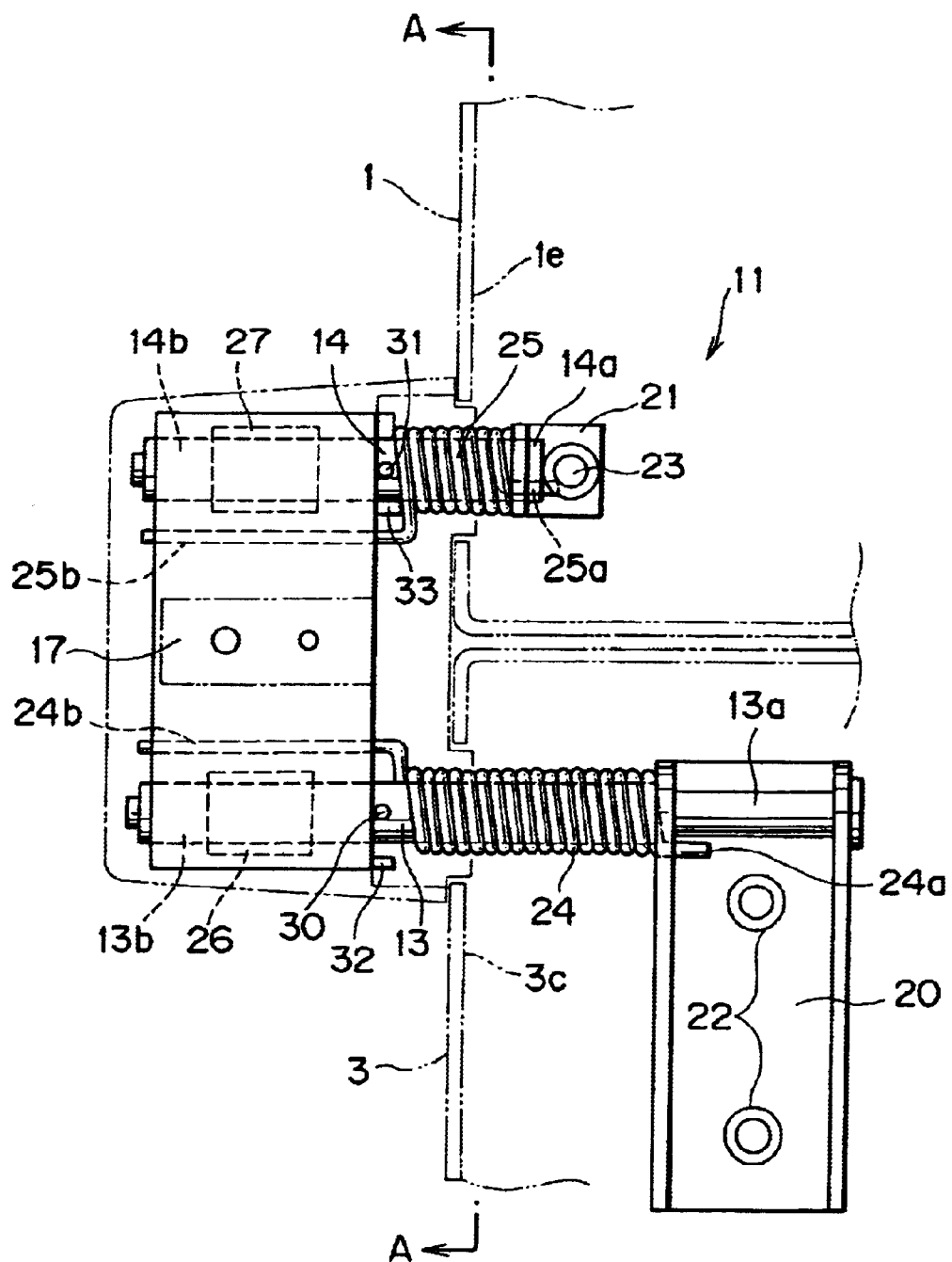
FIG. 6 is a plan view illustrating the double hinge mechanism.
Figure 7:
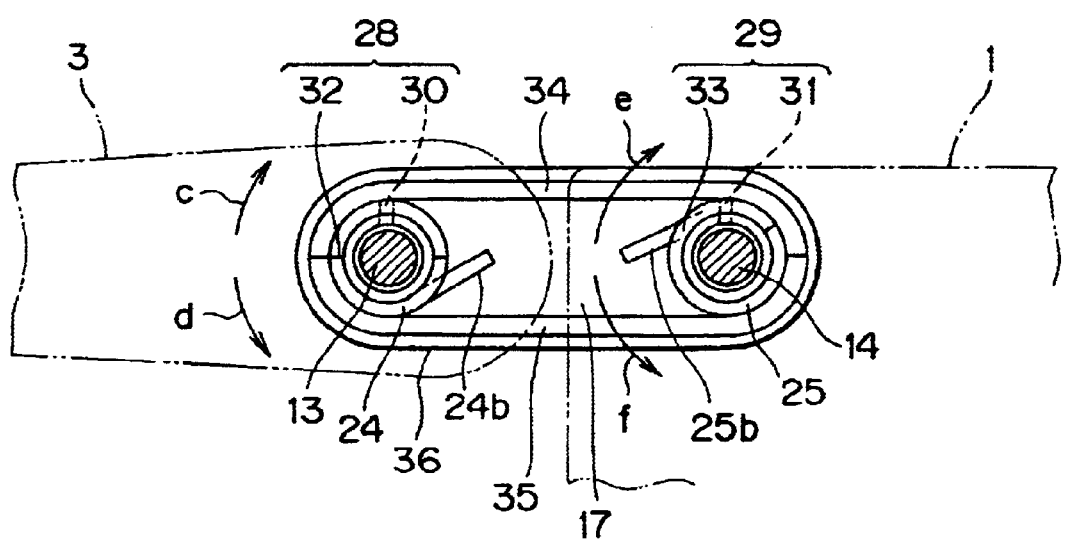
FIG. 7 is a sectional view taken along line A—A of FIG. 6.

As shown in FIGS. 5 and 6, one-side ends 13a, 14a being the inside ends of the parallel first and second hinge pins 13, 14 present in one-side double hinge mechanism 11 are attached respectively to brackets 20, 21, which are attached to the inside of the front cover 3 and the inside of the upper portion 1d of the liquid crystal projector main body 1 by screws 22, 23, whereby the first and second hinge pins 13, 14 are attached respectively to the front cover 3 and the liquid crystal projector main body 1. The hinge arm 17 rectangularly connects between the other-side ends 13b, 14b being the outside ends of the first and second hinge pins 13, 14, and the other-side ends 13b, 14b of the first and second hinge pins 13, 14 are supported rotatably relative to the hinge arm 17.

First and second torsion coil springs 24, 25 as first and second rotation energizing means are fitted over the outside peripheries of the first and second hinge pins 13, 14, and both end portions 24a, 24b and 25a, 25b of the first and second torsion coil springs 24, 25 are hooked respectively on the brackets 20, 21 and the hinge arm 17. By the first torsion coil spring 24, the front cover 3 is turningly energized in the direction of arrow c, namely, to the upper side with the first hinge pin 13 as a center relatively to the hinge arm 17; by the second torsion coil spring 25, the hinge arm 17 is turningly energized in the direction of e, namely, to the rear upper side with the second hinge pin 14 as a center relatively to the liquid crystal projector main body 1.

In order that a first rotation mode of rotating the front cover 3 in the direction of arrow c with the first hinge pin 13 as a center is first carried out and subsequently a second rotation mode of rotating the front cover 3 in the direction of arrow e with the second hinge pin 14 as a center is carried out at the time of opening the front cover 3 described later, a pair of dampers 26, 27 for giving a difference between the rotational loads of the first and second hinge pins 13, 14 are incorporated in the hinge arm 17 on the outside peripheries of the first and second hinge pins 13, 14. The dampers 26, 27 are, for example, composed of a cylindrical silicone rubber provided with a slit at a portion of the outside periphery thereof.

The one-side double hinge mechanism 11 is provided with rotational angle restricting means 28, 29 for restricting the rotational angle (turning angle) of the front cover 3 in the direction of arrow c relative to the hinge arm 17 to about 270° and restricting the rotational angle (turning angle) of the hinge arm 17 in the direction of arrow e relative to the liquid crystal projector main body 1 to about 90°. The rotational angle restricting means 28, 29 include stopper pins 30, 31 projected rectangularly at portions of the outside peripheries of the hinge pins 13, 14, and stopper pin abutment portions 32, 33 formed as one body with the hinge arm 17. Bisected covers 34, 35 formed of a plastic or the like are attached to the outside periphery of the hinge arm 17 by screwing or the like, and a cap 36 formed of a plastic or the like is fitted over the outside peripheries of the bisected covers 34, 35, whereby the first and second hinge pins 13, 14 and the hinge arm 17 are covered.

Next, the other-side double hinge mechanism 12 includes first and second parallel hinge pins 15, 16 and a hinge arm 18 rectangularly connecting between them, which are integrally formed of a plastic or the like. The first and second hinge pins 15, 16 are formed in the shape of hollow pins, and the hinge arm 18 is also formed to be hollow. The first and second hinge pins 15, 16 are turnably fitted respectively to the front cover 3 and the liquid crystal projector main body 1. A cap 37 formed of a plastic or the like is fitted over the outside of the hinge arm 18. Therefore, a roughly U-shaped hollow portion 38 is formed over the first and second hinge pins 15, 16 and the hinge arm 18. The first and second hinge pins 15, 16 and the hinge arm 18 are constituted in a bisected piece structure, and the hollow portion 38 is formed by combining the bisected pieces and fixing them by screws.

(1-2) Description of a Wiring Structure of Wires for the Loudspeakers

Next, as shown in FIGS. 8 and 9, a control substrate 41 being a printed wiring board on which a plurality of control switches operated by a plurality of operating buttons 6 of the control panel described above are mounted is incorporated in a roughly central portion in the front cover 3. Wires 42 being a harness for electrical connection between the control substrate 41 and a main circuit substrate (not shown) in the liquid crystal projector main body 1 are passed in a roughly U-shape through the roughly U-shaped hollow portion 38 formed along the first and second hinge pins 15, 16 and the hinge arm 17 of the other-side double hinge mechanism 12. Both left and right end portions of the control substrate 41 and the left-right pair of loudspeakers 4 are electrically connected by two wires 43, 44, and the lengths of the two wires 43, 44 are equal, whereby a reduction in cost by common design of the left-right pair of loudspeakers 4 and the wires 43, 44 is contrived. The left-right pair of loudspeakers 4 are also electrically connected to the main circuit substrate (not shown) in the liquid crystal projector main body 1 by the wires 42 through the control substrate 41.

(1-3) Description of a Locking/Unlocking Means for the Front Cover

Next, as shown in FIGS. 9 to 11, the liquid crystal projector is provided with a mechanism whereby the front cover 3 is automatically locked when the front cover 3 is roughly vertically stored in the recessed portion 45 of the liquid crystal projector main body 1 and the lock can be released by pushing an unlocking button. In this case, a locking/unlocking hook portion 51 is projected, slidably in the left-right directions of arrows g, h, at one 5a of a left-right pair of opposed surfaces 5a, 5b opposite to each other from both left and right sides in the recessed portion 5 of the front surface 1a of the liquid crystal projector main body 1, and the hook portion 51 is operated in conjunction with the unlocking button 25 fitted on the front side of one side portion 1b of the liquid crystal projector main body 1. Namely, the hook portion 51 is slidingly energized in a locking direction of arrow g to a lock position indicated by solid lines in FIG. 11 by a locking spring (not shown), and, by pushing a pushbutton 52, the hook portion 51 can be slidingly driven in an unlocking direction of arrow h against a locking spring to an unlock position indicated by dot-dash lines in FIG. 11 through a conjunction mechanism (not shown).

A hook portion 53 in a two streak shape or one streak shape is provided at the other opposed surface 5b of the recessed portion 5 of the liquid crystal projector main body 1, and a left-right pair of engaging portions 54, 55 being recessed portions with which the left-right pair of the hook portions 51, 53 of the liquid crystal projector main body 1 can be engaged and disengaged are provided at both left and right end faces 3c, 3d of the front cover 3. A slant surface 51a is provided at an upper surface of the tip end of one-side hook portion 51, and a slant surface 53a is provided particularly on the lower side of the other-side hook portion 53. Also, slant surfaces 54a, 55a are provided particularly on the lower side of the outside peripheries of the left-right pair of engaging portions 54, 55. Little gaps 56 are provided between the left and right end faces 3d of the front cover 3 and the left-right pair of opposed surfaces 5a, 5b of the liquid crystal projector main body 1.

(1-4) Description of Opening and Closing Operations of the Front Cover

Figure 1A:
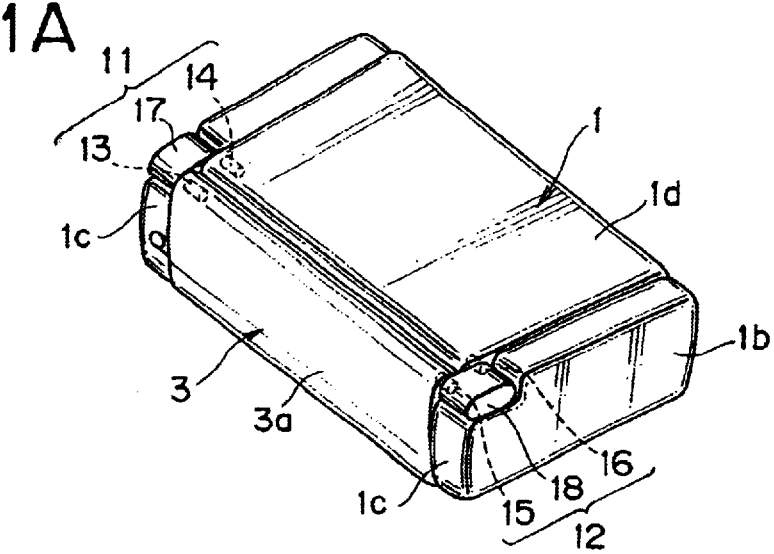
FIGS. 1A to 1C are perspective views showing the manner of opening and closing a front cover of a liquid crystal projector to which the present invention is applied.

Next, opening and closing operations of the front cover 3 will be described referring to FIGS. 1 to 11. First, FIGS. 1(A), 4 and 5 show the condition where the front cover 3 is roughly vertically stored at a storage position in the recessed portion 5 of the liquid crystal projector main body 1 so as to cover the front side of the projection lens 2. At this time, as shown in FIG. 11, the left-right pair of hook portions 51, 53 of the liquid crystal projector main body 1 are engaged with the left-right pair of engaging portions 54, 55 of the front cover 3, and the front cover 3 is locked at the storage position in the recessed portion 5. When the front cover 3 is in the stored condition, the five outside surfaces other than the bottom surface of the liquid crystal projector are all flat, the liquid crystal projector is in the condition of being small in size and high in portability, so that the liquid crystal projector can easily be carried by, for example, containing it in a bag.

Next, at the time of opening the front cover 3 to an upper portion of the liquid crystal projector main body 1, the unlocking button 52 shown in FIG. 11 is pushed, and the locking/unlocking hook portion Sa is slidingly driven in the direction of arrow h from the lock position indicated by solid lines to the unlock position indicated by dot-dash lines in FIG. 11. By this, the lock of the front cover 3 in the stored position is released, and the front cover 3 is automatically turned in the direction of arrow a in FIG. 2 to the open position shown in FIG. 1(C) and FIGS. 2 and 4.

Figure 1B:
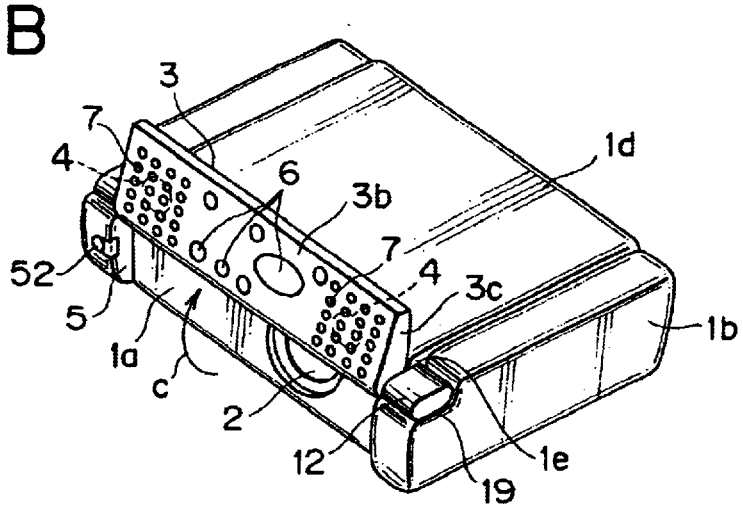

In this case, in the condition where the left-right pair of hinge arms 17, 18 are maintained roughly horizontal in the left-right pair of recessed portions 19 as shown in FIGS. 1(B) and 3 due to the rotational load exerted by the damper 27 at the outside periphery of the second hinge pin 14 of the one-side double hinge mechanism 11, the front cover 3 is rotated by roughly 180° in the direction of arrow c relatively to the left-right pair of hinge arms 17, 18 with the concentric first hinge pins 13, 15 of the left-right pair of double hinge mechanisms 11, 12 as a center from the storage position in the recessed portion 5 to a half-open position shown in FIG. 1(B) by the spring force charged in the first torsion coil spring 24 at the outside periphery of the first hinge pin 13, resulting in that the front cover 3 rises up roughly vertically to the upper side. At this time, a stopper pin abutment portion 32 of the hinge arm 17 abuts on a stopper pin 30 shown in FIG. 7 from the direction of arrow c, whereby the front cover 3 is stopped by being restricted in angle at about 90° relative to the hinge arm 17.

The moment the stopper pin abutment portion 32 abuts on the stopper pin 30 from the direction of arrow c, a rotational force in the direction of arrow e with the second hinge pin 14 as a center is subsequently exerted on the hinge arm 17 by the spring force charged in the second torsion coil spring 25 at the outside periphery of the second hinge pin 14. By this, the left-right pair of hinge arms 17, 18 of the left-right pair of double hinge mechanisms 11, 12 are rotatingly driven by about 90° in the direction of arrow e with the concentric left-right pair of second hinge pins 14, 16 as a center, whereby the front cover 3 is subsequently turned automatically in the direction of arrow e from the half-open position shown in FIG. 1(B) to the open position at an upper portion of the liquid crystal projector main body 1 shown in FIGS. 1(C), 2 and 4. Then, a stopper pin abutment portion 33 of the hinge arm 17 abuts on a stopper pin 31 shown in FIG. 7 from the direction of arrow e, whereby the front cover 3 is stopped at the open position.

Then, with the front cover 3 rotated in the direction of arrow e to the open position at the upper portion of the liquid crystal projector main body 1, the left-right pair of hinge arms 17, 18 of the left-right pair of double hinge mechanisms 11, 12 rise roughly vertically to the upper side of the left-right pair of second hinge pins 14, 16, and the left-right pair of first hinge pins 13, 15 supporting the front cover 3 are raised to positions higher than the upper portion 1d of the liquid crystal projector main body 1, whereby the control panel surface 3b and the left-right pair of loudspeakers 4 turned up of the front cover 3 are directed to the skewly rear upper side of the liquid crystal projector main body 1.

Figure 1C:
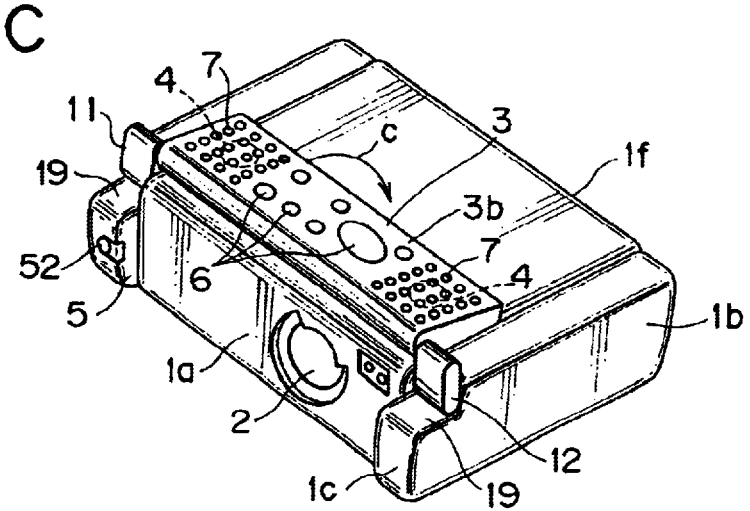

The open condition of the front cover 3 shown in FIGS. 1(C), 2 and 4 is the use condition of the liquid crystal projector where the front side of the projection lens 2 is opened and a picture can be projected onto a screen or the like by the projection lens 2. In the use condition of the liquid crystal projector, the operator and the audience are seated on the side of a rear surface 1f of the liquid crystal projector main body 1. Since the control panel surface 3b and the left-right pair of loudspeakers 4 of the front cover 3 are directed to the skewly rear upper side of the liquid crystal projector main body 1, the operability of the plurality of operating buttons 6 on the control panel surface 3b for the operator is conspicuously enhanced. In addition, since the voice generated from the left-right pair of loudspeakers 4 is directed to the skewly rear upper side of the liquid crystal projector, the voice is easy to hear for the audience seated on the side of the rear surface 1f of the liquid crystal projector main body 1, and acoustic effects are conspicuously enhanced.

At the time of returning the front cover 3 from the open position to the storage position, the front cover 3 is pushed in the direction of arrow b in FIG. 2. At this time, in reverse operation to that at the time of opening, first the hinge arms 17, 18 of the left-right pair of double hinge mechanisms 11, 12 are turned as one body with the front cover 3 in the direction of arrow f in FIG. 7 with the left-right pair of second hinge pins 14, 16 as a center, while a spring force is charged in the second torsion coil spring 25. Subsequently, the front cover 3 is turned relative to the left-right pair of hinge arms 17, 18 in the direction of arrow d in FIG. 7 with the left-right pair of first hinge pins 13, 15 as a center, while a spring force is charged in the first torsion coil spring 24.

Then, as shown in FIG. 11, the front cover 3 is returned to and stored in the storage position in the recessed portion 5 and the front side of the projection lens 2 is covered by the front cover 3, when the left-right pair of engaging portions 54, 55 are automatically engaged with the left-right pair of hook portions 51, 53 against the spring force of the lock spring and owing to guide actions of the slant surfaces 51a, 53a, 54a, 55a of these components, whereby the front cover 3 is automatically locked in the storage position.

According to the projector of the present invention constituted as described above, recesses and projections at the outside surfaces of the projector are eliminated, so that the projector can be constituted in a flat design, and portability of the projector is enhanced. A control panel or the like can be directed skewly rearwardly upward at an upper portion of the projector main body when the front cover is opened, so that operability at the time of projection of a picture or the like is conspicuously enhanced. The opening and closing of the front cover can be semi-automated, and the opening and closing operations can be made to be a smooth continuous operation. In addition, since the front cover can be stably locked in the storage position at the time of carrying the projector, the problems of chattering of the front cover and unintentional opening of the front cover due to unlocking at the time of carrying can be obviated, so that portability and safety are enhanced.

Besides, at non-use times such as at the time of carrying, the loudspeakers incorporated in the front panel are contained in the projector, and recesses and projections at the outside surfaces of the projector can be eliminated; at the time of use of the projector, the front side of the projection lens is opened, whereby the loudspeakers can be projected at an upper portion of the projector. Therefore, deterioration of appearance and deterioration of anti-dust property and anti-drop property as to the projector main body due to incorporation of the loudspeakers in the projector main body and exposition of a sound discharging portion provided with a multiplicity of minute holes at the outside surface of the projector main body can be obviated, and a simple appearance can be obtained. In addition, acoustic effects at the time of projecting a picture are enhanced. Besides, wirings to the loudspeakers and a substrate which are incorporated in the front panel are connected to a circuit in the projector main body by passing through a hollow portion of the hinges, so that the wirings are not exposed to the exterior and good appearance can be maintained.

While the invention has been described with reference to specific embodiment chosen for purpose of illustration, it should be apparent that numerous modifications could be made thereto by those skilled in the art without departing from the basic concept and scope of the invention.

What is claimed is:

1. A projector, comprising:
a box-shaped projector main body;
a projection lens exposed on a front side of said projector main body;
a front cover for covering and uncovering a front side of said projection lens; and
a pair of double hinge mechanisms for rotatably supporting both a left end portion and a right end portion of said front cover on said projector main body,
wherein: each of said double hinge mechanisms include:
first and second parallel hinge pins, an end of said first parallel hinge pin being supported by said front cover and an end of said hinge pin being supported by said projector main body; and
a hinge arm rectangularly connecting an other end of each of said first and second hinge pins; and
said front cover is rotated between a storage position that is approximately vertically disposed on said front side of said projector main body to cover said front side of said projection lens and an open position of contacting an upper portion of said projector main body to uncover said front side of said projection lens.

2. The projector as set forth in claim 1, wherein said storage position of said front cover is formed in a recessed portion provided on said front side of said projector main body and said front cover is stored by being disposed in said recessed portion.

3. The projector as set forth in claim 1, wherein an inner side of said front cover is a control panel.

4. The projector as set forth in claim 3, wherein a surface of said control panel is inclined rearwardly upward when said front cover is rotated to said open position.

5. A projector, comprising:
a box-shaped projector main body;
a projection lens exposed on a front side of said projector main body;
a front cover for covering and uncovering a front side of said projection lens; and
a pair of double hinge mechanisms for rotatably supporting both a left end portion and a right end portion of said front cover on said projector main body,
wherein: each of said double hinge mechanisms include:
first and second parallel hinge pins, an end of said first parallel hinge pin being supported by said front cover and an end of said second parallel hinge pin being supported by said projector main body; and
a pair of hinge arms each rectangularly connecting an other end of each of said first and second hinge pins;
said front cover is rotated between a storage position that is approximately vertically disposed on said front side of said projector main body to cover said front side of said projection lens and an open position of contacting an upper portion of said projector main body to uncover said front side of said projection lens; and
said projector further includes:
locking means for locking and unlocking said front cover at said storage position;
first rotation energizing means for rotationally energizing said front cover towards said upper side relative to said hinge arms; and
second rotation energizing means for rotationally energizing said front cover towards a rear upward side relative to said hinge arms,
said first and second rotation energizing means being disposed respectively at outer peripheries of said first and second hinge pins of one of said pair of double hinge mechanisms.

6. The projector as set forth in claim 5, wherein said one of said pair of double hinge mechanisms includes:
a first rotation mode in which said front cover is rotated upward by approximately 180° with said first hinge pin as an axis of rotation by said first rotation energizing means when said front cover is unlocked at said storage position; and
a second rotation mode in which after said first rotation mode said front cover is rotated to a rear side by approximately 90° with said second hinge pin as said axis of rotation by said second rotation energizing means.

7. The projector as set forth in claim 5, wherein said one of said pair of double hinge mechanisms includes a pair of dampers having different rotational loads for performing said first rotation mode and said second rotation mode.

8. The projector as set forth in claim 5, wherein said first and second rotation energizing means are each composed of a torsion coil spring.

9. The projector as set forth in claim 5, wherein said storage position of said front cover is formed in a recessed portion provided at said front side of said projector main body; said front cover is stored by being vertically disposed in said recessed portion; a left-right pair of opposite surfaces in said recessed portion opposed to left and right end faces of said front cover are provided with a left-right pair of hook portions; said left and right end faces of said front cover are provided with engaging portions for engagement with said left-right pair of hook portions; and one of said left-right pair of hock portions is said locking means.

10. A projector, comprising:

a box-shaped projector main body;

a projection lens exposed on a front side of said projector main body;

a front cover for covering and uncovering a front side of said projection lens; and a loudspeaker incorporated in said front cover and directed towards an upper portion of said projector main body when said front cover is moved from a storage position in which said front cover covers said front side of said projection lens to an open position in which said front cover is moved to an upper portion of said projector main body to uncover said front side of said projection lens.

11. The projector as set forth in claim 10, wherein said loudspeaker is directed rearwards and upwards when said front cover is moved to said open position.

12. The projector as set forth in claim 10, wherein a hinge mechanism is provided for rotating said front cover relative to said projector main body between said storage position and said open position; and said loudspeaker is disposed on an inner side of said front cover such that said loudspeaker is directed to said upper side or a rear upper side of said projector main body when said front cover is rotated from said storage position to said open position by said hinge mechanism and said inner side of said front cover is directed upwards or rearwardly upwards.

13. The projector as set forth in claim 12, wherein said hinge mechanism is provided with a hollow hinge pin and a wiring for connection between a circuit in said projector main body and said loudspeaker and a control panel substrate incorporated in said front cover is passed through said hollow hinge pin.

* * * * *